US006270409B1

(12) United States Patent
Shuster

(10) Patent No.: US 6,270,409 B1
(45) Date of Patent: Aug. 7, 2001

(54) METHOD AND APPARATUS FOR GAMING

(76) Inventor: Brian Shuster, P.O. Box 2153, Stateline, NV (US) 89449

( * ) Notice: Subject to any disclaimer, the term of this patent is extended or adjusted under 35 U.S.C. 154(b) by 0 days.

(21) Appl. No.: 09/247,235

(22) Filed: Feb. 9, 1999

(51) Int. Cl.7 ...................................................... A63F 13/00
(52) U.S. Cl. .......................................... 463/20; 273/143 R
(58) Field of Search ................................ 21/370; 463/20, 463/21, 25; 273/139, 142 H, 138.2, 143 R

(56) References Cited

U.S. PATENT DOCUMENTS

| | | | | |
|---|---|---|---|---|
| 4,669,731 | * | 6/1987 | Clarke | 273/143 R |
| 5,083,785 | | 1/1992 | Okada . | |
| 5,178,390 | | 1/1993 | Okada . | |
| 5,370,399 | | 12/1994 | Liverance . | |
| 5,393,061 | * | 2/1995 | Manship et al. | 273/143 R |
| 5,511,781 | | 4/1996 | Wood et al. . | |
| 5,551,692 | | 9/1996 | Pettit et al. . | |
| 5,564,700 | | 10/1996 | Celona . | |
| 5,611,730 | | 3/1997 | Weiss . | |
| 5,626,341 | | 5/1997 | Jones et al. . | |
| 5,697,843 | * | 12/1997 | Manship et al. | 463/20 |
| 5,910,048 | * | 6/1999 | Feinberg | 463/25 |
| 6,068,552 | * | 5/2000 | Walker et al. | 463/21 |

FOREIGN PATENT DOCUMENTS

| | | | |
|---|---|---|---|
| 2098779 | * | 9/1982 | (GB) . |
| 2144568A | * | 3/1985 | (GB) . |

* cited by examiner

*Primary Examiner*—Joe H. Cheng
*Assistant Examiner*—Kathleen M. Christman
(74) *Attorney, Agent, or Firm*—O'Melveny & Myers LLP

(57) ABSTRACT

The instant invention is directed to a gaming method and apparatus wherein the participants are guaranteed to win a minimum amount after a fixed period of time or a predetermined number of games. Preferred embodiments of the instant invention include the determination of the parameters for the minimum win and controlling the gaming device, wherein determination of the parameters for the minimum win includes the determination of the win interval and the minimum guaranteed award amount for achieving the win interval. If a player achieves a win interval, the player can received a minimum guaranteed award amount or proceed to the next level of play. Play continues until the player achieves a winning combination or chooses to receive the minimum guaranteed award amount.

20 Claims, 2 Drawing Sheets

METHOD AND APPARATUS FOR GAMING

FIELD OF THE INVENTION

This invention is directed to a method and apparatus for gaming; more particularly, to a method and apparatus for gaming which is capable of ensuring a minimum amount of winnings for the participants at predetermined intervals.

BACKGROUND OF THE INVENTION

Gaming, or sports of chance, have long intrigued and enticed the general public. Indeed, despite the higher probability of losing than winning, gaming is popular and includes simple single play events, such as a flip of a coin, to multi-play events, such as a football pool for a series of championship games.

One popular gaming device is the slot machine. A slot machine requires one, two, three or more coins or tokens to be inserted or credits to be used. Once the coins are inserted, a lever arm of push button is actuated which spins a plurality of reels, typically three, wherein each reel has various symbols on its face. The reels spin for a given period of time and stop. When the reels stop, a symbol for each reel is displayed in the view window of the slot machine. Depending upon the combination of symbols that align in a line, a predetermined payout, if any, is ascertained. As only a limited number of winning combinations exist, in many instances, no payout is provided for the combination of symbols that results from the actuation of the lever arm. Thus, it is possible that a participant could play for an extended period of time and not win. As most participants desire to win, rather than lose, the longer the time period played without a win, the less likely it will be to maintain the participant's interest or participation.

Attempts have been made to provide some assurance of a win for the participants. For instance, U.S. Pat. No. 5,178,390 to Okada is directed to providing insurance to the participant. In the '390 reference, if the participant chooses to accept insurance, an insurance period is effectuated. During the insurance period, the total amount wagered by the participant, or the number of games played, is accumulated. If the user fails to win during the insurance period, when the accumulated value or number of games reach a predetermined amount, a predetermined value of insurance is paid out and the insurance period ends. Thus, the insurance amount can offset the loss suffered by the participant. Nonetheless, the participant must initially pay for the insurance for this aspect of the game to be activated.

U.S. Pat. No. 5,083,785 to Okada is directed to a game utilizing a win judgment table. The table stores winning information corresponding to each integer in a set of integers. A selected integer, which is assigned to a special win is located at the end of the set of integers. In the '785 reference, a random integer is sampled in the first game and a win judgment is based on this random integer. In subsequent games the sampled integer is incremented and the integer resulting from the incrementation of the sampled integer is used for the new game. This step is repeated until the integer resulting from incrementation is the selected integer, where the special win will occur. Although this method is directed towards effectuating a special win, there is no defined time frame under which a special win will occur.

U.S. Pat. No. 5,511,781 to Wood et al. is directed to a gaming system wherein a participant is offered an award prior to the completion of the game. If the participant accepts the reward, the game is terminated. If the participant does not accept the award, the participant risks losing any winnings at all.

Although the above systems attempt to provide some assurances for the participant to recapture some of their wager, none of the systems guarantee a win during a predefined time frame or predefined number of games. Further, none of the current systems allow a player to forego the acceptance of a guaranteed win for the opportunity to attain a large guaranteed win amount. A need exists in the industry for a system that guarantees a win in a specified time period or after a predetermined number of games. A further need exists for a system that allows the participant to forego a guaranteed win in exchange for an opportunity to win a higher guaranteed amount.

SUMMARY OF THE DISCLOSURE

The instant invention is directed to a gaming method and apparatus wherein the participants are guaranteed to win a minimum amount after a fixed period of time or a predetermined number of games. Preferred embodiments of the instant invention include the steps of determining the parameters for the minimum win and controlling the gaming device. The step of determining the parameters for the minimum win includes the steps of determining the win interval and the minimum guaranteed award amount for achieving the win interval.

The win interval is the amount of plays or the amount of accumulative wager that must be placed prior to a guaranteed award being payed. In instances wherein the number of games in the win interval are played, and the player fails to win, the guaranteed award will be paid. In some preferred embodiments, the player is given the option of foregoing the guaranteed award and progressing to the next level of play for a new minimum guaranteed award.

Once the win interval and amounts for winning are determined, the gaming apparatus is configured. Thus, for example, if the gaming apparatus is a slot machine, the slot machine is preprogrammed with the win interval and the payout schedule. Thus, during play, the slot machine will recognize when a pay condition is achieved.

A feature of embodiments of this invention is the guarantee to win a minimum amount after a predetermined number of games. An advantage of this feature is that the participants will remain more interested in the game and will participate longer as they will be assured of recouping some, if not all, of their wagered amount.

Another feature of this invention is the allowance of the forfeiture of the guaranteed win for the opportunity to continue to play and win a second guaranteed win which is higher than the minimum for the first guaranteed win. An advantage of this feature is that it allows participants to risk winnings with the security that they will nonetheless, win some amount. Another advantage of this feature is that it maintains the interest of the participants such that play time is increased.

Yet another feature of preferred embodiments of this invention is that the predetermined number of games or amount of time that must elapse prior to winning is displayed. An advantage to this feature is that participants are informed in advance of the amount of play that must occur prior to their opportunity to win. A further advantage of this feature is that participants will be more willing to participate in the game as they will have advance knowledge of the win time.

Still another feature of preferred embodiments of the instant invention is that the progressive amounts of the guaranteed winnings are available to the participants prior to playing. An advantage of this feature is that the participant is aware of the minimum amounts of return possible prior to participation in the game, which decreases the amount of risk a participant is required to incur and thereby increases the number of participants who would be willing to play.

The above and other features and advantages of embodiments of this invention will be apparent from the following more detailed description when taken in conjunction with the accompanying drawings. It is intended that the above advantages can be achieved separately by different features of the invention and that additional advantages of this invention will involve various combinations of the above independent features such that synergistic benefits may be obtained from the combined techniques.

BRIEF DESCRIPTION OF THE DRAWINGS

The detailed description of embodiments of the invention will be made with reference to the accompanying drawings, wherein like numerals designate corresponding parts in the figures.

DETAILED DESCRIPTION OF THE PREFERRED EMBODIMENTS

Preferred embodiments of the invention are directed to a method and apparatus for gaming, wherein the participant is guaranteed to win a minimum amount after the establishment of a win interval, such as, for example, a predetermined number of games or a predetermined accumulated wager. Although this method can be used with any apparatus or game for wagering, the disclosure will be directed to slot machines. It is hereby understood that this is not intended to limit the disclosure, but rather, all embodiments within the spirit and scope of the instant invention are intended.

Figure 1:
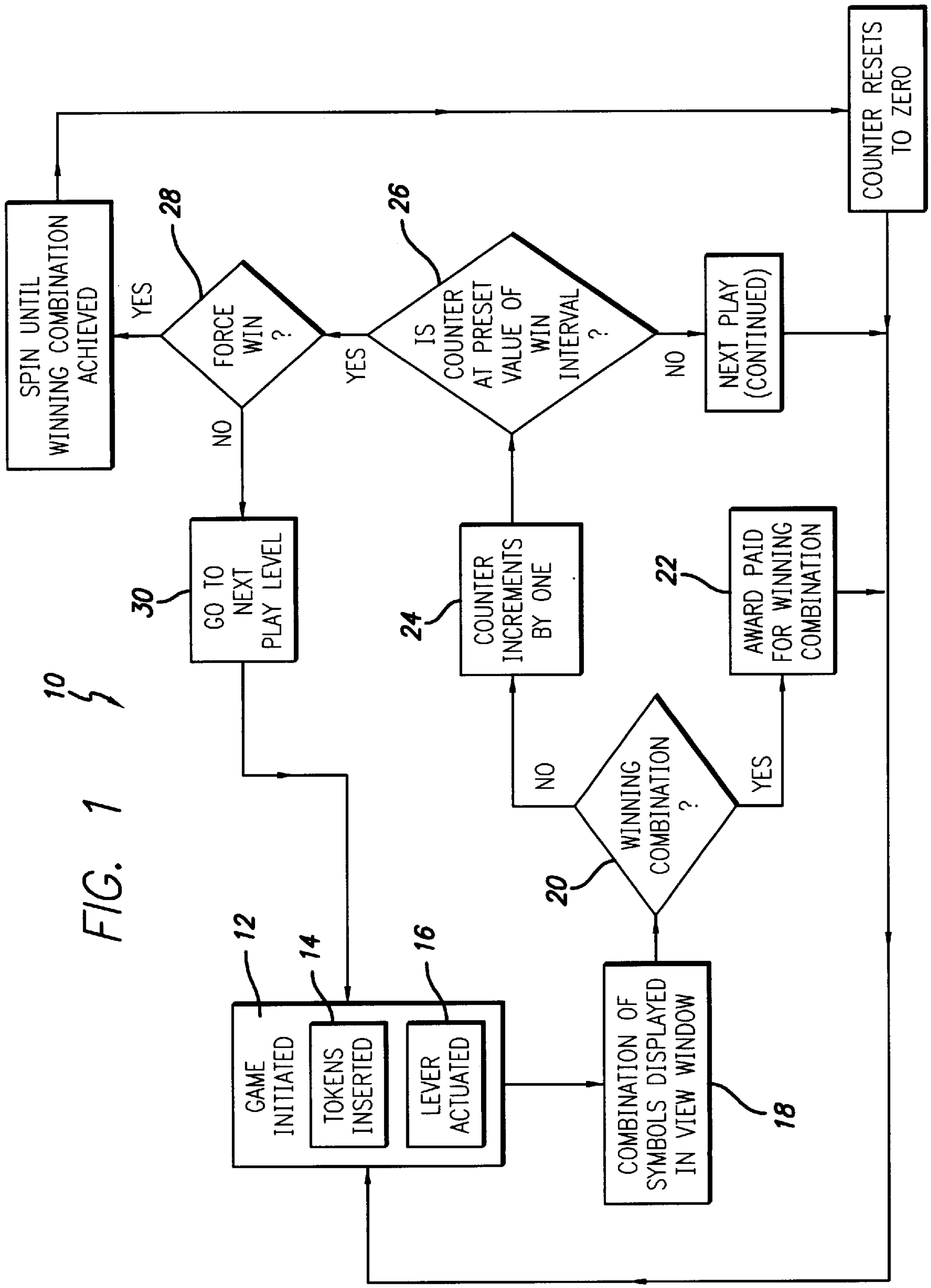
FIG. 1 is a schematic of a gaming method of a preferred embodiment of the instant invention.

FIG. 1 is an illustrative schematic of a preferred embodiment of a gaming method 10 played on a slot machine 34, wherein the slot machine 34 includes a counter 36. For purpose of illustration, it is assumed that this is the beginning of play on this slot machine. As such, the counter is set at zero.

An end user initiates a game 12 by inserting a required minimum number of tokens 14 into the slot machine and actuating the lever 16 or depressing a button or any other suitable means for initiating play. It is to be understood that any acceptable payment, including, but not limited to, credits, money or any means of purchasing game plays or credits, is suitable. The actuation of the lever 16 initiates the spinning of the reels. When the reels stop spinning a combination of symbols are displayed 18 in the view window. A controller 42 in the slot machine 34 determines whether the resulting combination is a winning combination 20. If the combination is a winning combination, the slot machine 34 automatically pays the amount of award 22 predetermined for that particular combination.

Since a payout was made to the participant, the counter 36 remains at zero and the slot machine 34 is ready for continued play. To play, the participant again inserts the required number of tokens 14 and actuates the lever 16. If the reels 38 do not produce a winning combination at the cessation of the spin, the counter 36 in the slot machine incremented by one 24. Thus, the counter is now at one. The player now has the option of continuing to play or terminating play. If the player terminates the play, the counter remains at one and the player receives no further payment. As the counter remains at one, the win interval has commenced and a new player can continue to play this win interval.

Assuming the participant continues to play, the participant again inserts the required minimum number of tokens 14 and actuates the reels 16. An evaluation is again made regarding the resulting combination of symbols. If no winning combination is achieved, the counter increments again by one 24. IF the wheels stop on a winning combination, the counter will reset to zero.

This manner of play continues until the win interval is established 26, that is, until the counter reaches a preset number, for example, five, or the participant spins a winning combination. If the counter reaches five, which represents the loss of five successive games, the slot machine notifies the participant that the win interval has been achieved and that the next actuation of the lever will result in a forced win 28. More specifically, the next actuation of the lever will initiate the continuous re-spinning of the reels until a winning combination results. Thus, if the reels spin and do not result in a winning combination, the reels will automatically respin, without intervention by the participant, until a winning combination results. For example, in one preferred embodiment, the controller selects a winning combination and the reel is spun until that winning combination is achieved. It is to be understood that the controller can force the winning combination to be achieved by the next successive spin or can be allow multiple spins before achieving the winning combination. The participant is then paid the preset amount of award based upon the resulting winning combination, wherein the award is guaranteed to be at least the minimum amount. In another preferred embodiment (not shown), the participant must activate a "Forced Win" button on the slot machine to force the win. In this embodiment, the actuation of the lever causes the game 12 to advance to the next level of play.

In another preferred embodiment, instead of forcing the win, the participant can choose to continue to play 30. If the participant continues to play, the participant pushes a next play indicator button on the slot machine. Upon the actuation of the next play button, the slot machine resets the guaranteed minimum award amount, which is set higher than the initial, or first, guaranteed award amount. The player then continues to play in the manner described above. Play will continue, and progressively higher minimum amounts will be guaranteed, until the player spins a winning combination or forces a win.

Variations of the above described method of gaming will be described below and the above is not intended to limit the invention. Rather, it is intended as an illustration of the overall method of play from the participant's perspective.

Prior to participation by the player, the parameters for play must be preset and the slot machine must be configured to recognize the play parameters. Preferred embodiments of the gaming process include the steps of determining the parameters for the guaranteed win and controlling the gaming device. The step of determining the parameters for the guaranteed win includes the steps of determining a win interval and determining a first guaranteed award amount for achieving the win interval.

A win interval is the criteria by which a participant will be minimally awarded the first guaranteed award amount. The win interval can be based on any parameters, such as, for example, the number of games played. For instance, in some preferred embodiments, a win interval is determined to be the playing of five consecutive games, wherein in each game played the user has inserted the required wager, that is, a specific number of tokens. In these embodiments, the combination of the number of games and the amount of wager for each game is the required win criteria. Thus, playing five games, but not wagering the required amount will not establish the win interval. In other preferred embodiments, the win interval is defined by a preset amount of cumulative wager being placed. For instance, in one embodiment, a preset amount of wager, such as, for example, 30 coins, must be played during a given number of games, such as, for example, 10 games. In another embodiment, only a preset amount of wager must be played, such as, for example, 30 coins, without restricting the number of plays. During play, once the win interval has been established, the user will be eligible to receive a first guaranteed award amount. It is to be understood that the guaranteed award amount is a minimum amount guaranteed, but that, as discussed below, higher amounts can be paid depending upon the award schedule and the winning combination achieved.

In one preferred embodiment, to establish a win interval, the participant must meet the preset criteria, and fail to win any of the individual games. Thus, the win interval only occurs, that is, is established, if, for example, the participant has lost the preset number of games, and played the required wager in each game. Thus, for a five game, three token per game criteria, if a participant wins the fourth game played, he is paid according to the preestablished award schedule (discussed below) and a new win interval commences. As such, the participant is not eligible to receive a first guaranteed award amount on the completion of the next game, since the next game played is game one in the new win interval. It is to be understood that any criteria can define the win interval. For example, and as described above, the win interval can be defined as a predetermined number of consecutive losses of a plurality of games played. In another preferred embodiment, the win interval can be defined as the summation of wins and losses for a predetermined number of games played, wherein the total number of wins do not exceed a preset number. For example, a win interval is set at ten games, where no more than four of the ten games can result in a win.

The determination of the first guaranteed award amount is based, in part, on the award schedule for the winning combination. The award schedule is a set of awards, such as, for example, an amount of money pair to the participant, which corresponds to the winning combinations, wherein the award for each winning combination is based on the odds of achieving the winning combination. Thus, the odds of achieving a particular winning combination can change depending upon the configuration of the reels, that is, the type and number of each symbol included on each reel. Typically, the reels have standard configurations. However, these configurations can be defined, for example, by the owner, gaming director of operator, and therefore, will change the odds of achieving a specific combination.

The table below sets forth one preferred embodiment of a particular combination of wins, the odds of those combinations being achieved and the award amount for each particular win.

TABLE I

| Combination | Odds of Winning Combination (3 coins played) | Award Amount Paid |
|---|---|---|
| AAA | 16.67% | 3 coins |
| BBB | 3.7% | 12 coins |
| CCC | .46% | 100 coins |

The above table is only one example of a determination of the award schedule. Indeed, in other preferred embodiments, the award schedule is established by standard gaming establishments, such as, for example, the gaming commission or Las Vegas casinos. Further, and as stated above, in other preferred embodiments, the award schedule is owner defined, wherein the configuration of the reels on the slot machine correspond to the odds determined by the slot machine or casino owner.

The choice of the first guaranteed award amount is further determined, in part, on the odds of winning. Indeed, the first guaranteed award amount is preset to allow the machine owner, gaming director, or operator the ability to maintain a desired level of odds for winning. In preferred embodiments, the first guaranteed award amount is set higher than the minimum amount paid by the award schedule. Thus, for example, if the winning combination having the highest odds pays three coins, the first guaranteed award amount is minimally set at three coins.

Once the criteria for winning and the first guaranteed award amount have been established, the gaming device is configured to respond to the parameters for the minimum win, including the win interval, and to recognize winning combinations and the amounts to be paid for a particular winning combination. The step of controlling the gaming device includes configuration of the machine to recognize the minimum with parameters and to notify the player of the next level of play.

The configuration of the machine to recognize the minimum win parameters is accomplished by any means capable of tracking the number of plays, wherein the required minimum wager is made. In one preferred embodiment, a counter, coupled to a controller, such as a computer, is placed within the slot machine, wherein the controller sends a signal to the counter indicating whether the minimum wager has been placed. The counter increments each time the minimum required number of coins or tokens are played and the player's spin does not result in a winning combination of symbols on the view line of the slot machine. The counter increase by one each time this occurs. If the player fails to spin a winning combination at the elapse of the win interval, for example, five plays, wherein the minimum wager is made in each game, the slot machine can force a win. As stated above, a forced win is the situation in which the slot machine causes a winning spin to occur. For example, in one preferred embodiment, the slot machine continuously and automatically spins until a winning combination is achieved. In another preferred embodiment, the slot machine automatically spins once to produce a winning combination, which is randomly chosen, such as, for example, by a random generator that only contains winning combinations. After the forced win is achieved, the counter resets to zero.

In instances wherein the player spins a winning combination prior to the elapse of the win interval, there is no forced win as the player has already won. In these instances, upon payment for the winning combination, the counter resets to zero and the win interval is reset. It is to be understood that the amounts paid to the player are preestablished for the achievement of a winning combination in the award schedule, whether that combination is achieved by the player prior to the elapse of the win interval or during a forced win. Additionally, for wins prior to the elapse of the win interval, the player can win less than the guaranteed amount as combinations paying less than the guaranteed amount might be the winning combination achieved. Indeed, the guaranteed amount is only set for wins after the win interval has elapsed. For example, the guaranteed win might be six coins, however, a combination such as two cherries and a seven may pay four coins. If the two cherry, seven combination is spun prior to the elapse of the win interval, the player will receive four coins. However, if the win interval has elapsed, during a forced win, this combination will not trigger a payout; rather, the machine will respin until a combination paying six or more coins is achieved. Thus, with reference to Table 1, during a forced win, combinations AAA, BBB or CCC would be considered winning combinations in this example.

In other preferred embodiments, the guaranteed award amount is set as a minimum win for all wins, whether achieved prior to, or after, the elapse of the win interval. Thus, for instance, with reference to the above example, no winning combination would pay less than six coins for the entirety of the win interval. Typically, in this embodiment, the guaranteed amount would be set at the amount corresponding to the lowest paid winning combination. Thus, with reference again to Table 1, in this preferred embodiment, the first guaranteed award amount would be three (3) coins. Nonetheless, in all instances, the player is notified of the awards to be won for each combination prior to the commencement of the game. For instance, the award amount for a particular combination and the odds of achieving that combination are posted on the slot machine.

Referring again to the instance in which a win interval has been established, in some preferred embodiments, the player is notified that the next spin will force a win, or if desired, that a new level of play can be commenced. Thus, the player is given the option of continuing to play and forego the payment of the first guaranteed award amount. If the player chooses to force the win, the player activates the lever arm of the slot machine and initiates the spin(s) for a forced win. In one preferred embodiment, as stated above, if the player proceeds, the slot machine will automatically spin until a winning combination is achieved.

If however, the player chooses to forego the payment of the first guaranteed award amount and advance to the second play level, the player will activate a next level indicator (FIG. 2) on the slot machine 34 and a second guaranteed award amount will be set. The player will then continue to play as described above until the win interval has been established or until the player spins a winning combination. As in the first level of play, if the player spins a winning combination prior to the elapse of the win interval, the player will receive an award based upon the award schedule preset for that winning combination. Otherwise, if the player establishes the win interval, the player can force a win, thereby minimally receiving the second guaranteed award amount.

In some preferred embodiments, a true minimum guaranteed award amount is set, wherein the true guaranteed amount is less than the second guaranteed amount for a forced win, but more than the first guaranteed award amount at the first level. For example, in a game wherein the first guaranteed award amount is six coins, for a second level play, the second guaranteed award amount of win for the force win is set at ten coins, and the true minimum guaranteed amount is set at eight coins. Thus, the true guaranteed award amount is less than the amount for the second guaranteed win, but more than the amount for the first guaranteed award amount paid at the first level of play. As such, in this embodiment, any combinations that do not pay a minimum of eight coins does not trigger a win in this level of play. In some preferred embodiments, the payout for each winning combination is reset for each level of play such that the lowest paying combination corresponds to the true guaranteed award amount.

If the player does not win prior to the elapse of the win interval, for example, another five games wherein the minimum amount has been wagered, the option of forcing the win or proceeding to the next play level is again presented to the player. This step continues to repeat until the player either chooses to force the win, or spins a winning combination.

To illustrate the award amounts for play, the payout for a three level game, which includes a true guaranteed award amount, are set forth in the table below.

TABLE 2

| | Level One | Level Two | Level Three |
|---|---|---|---|
| Guaranteed Award (Forced Win) | 4 coins | 8 coins | 12 coins |
| True Guaranteed Award (Minimum for and winning spin) | N/A | 6 coins | 10 coins |

It is to be understood that any schedule of payout is possible. Thus, for example, a true minimum guaranteed award amount need not be included in the award schedule. Indeed, as stated above, in one preferred embodiment, the guaranteed award for a forced win is the absolute minimum award for any win of the play level. Thus, in this embodiment, for level three, the minimum award for a winning combination is twelve coins. In other preferred embodiments, the guaranteed award amount is only the award guaranteed if the win interval is established.

Figure 2:
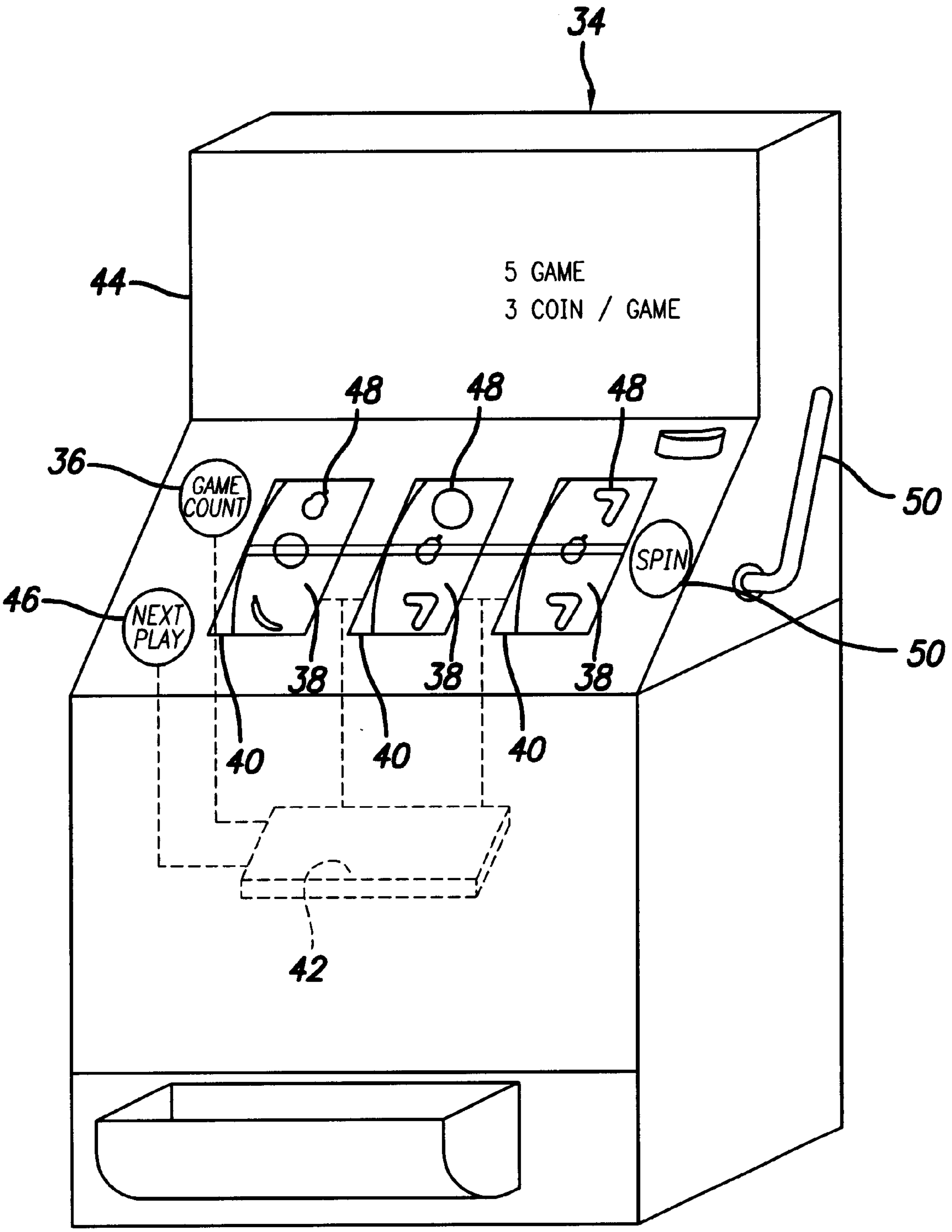
FIG. 2 is a front perspective of a preferred embodiment of a slot machine.

With reference to FIG. 2, a slot machine 34 for preferred embodiments of this invention comprises a housing 44, a plurality of rotatable reels 38, a counter 36, a next play indicator 46 and a controller 42. The housing 44 has a partially hollow interior and houses the reels 38 and the controller 42.

Each reel 38 includes a set of symbols 48, such as, for example, numbers or pictures, wherein predetermined combinations of the symbols define winning combinations. For example, two cherries and a seven may be defined as a winning combination, whereas one cherry, one seven and a peach is not predefined as a winning combination.

The machine further comprises a viewing line 40 which, in preferred embodiments, is at least one transparent window. In one preferred embodiment, the viewing line 40 is a plurality of transparent windows, wherein the number of windows correspond to the number of reels 38. An actuation member 50, such as, for example, a button or a lever, initiates the rotation of the reels and causes them to spin such that a symbol from each reel is revealed in the window upon the cessation of the spin. The combination of symbols appearing in the window defines whether the spin has resulted in a win.

The counter 36 is configured to increment upon the occurrence of a predefined set of conditions, discussed above. The counter 36 is any means for incrementing a stored value to the next consecutive value, such as, for example, a computer program or a click through which increments the stored count. The counter 36 is electronically coupled to the controller 42, wherein the controller causes the counter to increment upon the occurrence of the predefined set of conditions.

The next play indicator 46 is a button that is activated by the player and is in electronic communication with the counter 36. Upon actuation, the next play indicator 46 relays the information to the slot machine to advance to the next level of play and reset guaranteed award amounts once the counter has reached the preset win interval. The controller 42 is coupled to the next play indicator 46 and resets the payout amounts when the next play indicator 46 is activated.

The controller 42 for the slot machine 34 is a computer, such as, for example, a personal computer, although any means capable of programming the slot machine to recognize and monitor the desired parameters, including, but not limited to, win intervals, payout levels and winning combinations, and otherwise control and monitor the activities within the slot machine is suitable. In one preferred embodiment, the controller 42 is an integrated circuit. The controller monitors various events within the slot machine. For instance, the controller counts the number of tokens inserted for each game and stores gaming information, including, but not limited to, odds of winning, sets of winning combinations, payouts for each win, minimum payouts for each game and the game level. The controller is configured to recognize a winning combination and cause the machine to dispense the predetermined award amount. Further, the controller is configured to monitor the number of games and tokens played for each game such that it is capable of recognizing the occurrence of a win interval.

In accordance with the preferred embodiments described above, during operation, a slot machine owner or operator will determine game parameters, namely, a win interval, a set of winning combinations, the odds of winning those combinations an a series of play levels, wherein each play level establishes a minimum guaranteed award amount for a forced win. In some embodiments, a true guaranteed award amount is also set, which is the minimum win for any winning combination.

Once the game parameters are determined, the slot machine 34, or series of slot machines are equipped with counters 36, or other means for tracking the win interval, and a next play indicator 46 for advancing play to the next play level. Further, each of the machines are programmed to pay particular award amounts for winning combinations given a particular play level, to recognize the elapse of the win interval and to recognize the activation of the next play indicator. Typically, the win interval, the win awards for a given combination and odds of winning particular combination for each play level are posted on the outside of the machine for the players.

Once the machines is prepared, it is ready for play. To initiate play, a player inserts the maximum number of coins or tokens to initiate the win interval and actuates the lever or button to spin the reels. If a winning combination appears on the line, the machine will pay the preset award amount corresponding to the particular combination achieved. If no winning combination is achieved, the counter 36 increments by one. Typically, for each new player the counter 36 is set at zero and thus, after one losing play, the counter will advance to one. The player continues to play until either a winning combination is spun by the player or the win interval elapses. If the player achieves a winning combination prior to the win interval elapsing, for example, five games, the counter is reset to zero and the win interval begins again. If the player does not win, after the fifth game, using the above example, the machine indicates that the next spin initiates the forced win. If the player chooses to force the win, he need only initiate the spin. Once initiated, the machine continues to spin until a winning combination paying the minimum guaranteed amount is achieved.

If instead, the player chooses to advance to the next play level, the player activates the next play level indicator. This resets the minimum guaranteed win to the amount which has been preset for that particular play level. In some preferred embodiments, the machine additionally sets a true guaranteed award amount for that particular play level. The game then advances in the same manner as described above and continues until the player forces a win or spins a winning combination prior to the elapse of the win interval. For each new play level, the guaranteed award amount and, if applicable, the true minimum guaranteed award amount are increased.

In another preferred embodiment, a progressive game is established. In this embodiment, participating slot machines are connected to a simple, progressive jackpot in their particular price range. For instance, nickel machines are in electronic communication with nickel machines, and dollar machines are in electronic communication with dollar machines. Numerous players could play at the same time or during the same time period. Similar to other progressive games, the jackpot would increase as all of the players place wagers. Each player would then participate in the progressive game on one of the coupled machines. The first player to achieve the designated win level on one of the individually coupled machines, for example, the player loses fifteen levels of play, would win the progressive jackpot.

Although the invention has been described with reference to particular embodiments, it is to be understood that above described steps need not all be performed in each embodiment. For instance, in some embodiments, only one play level exists. Thus, once the win interval has elapsed, the machine automatically forces a win. Further, in some preferred embodiments, the win interval must be established by the consecutive establishment of win criteria, for example, the required wager and loss of game. In another preferred embodiment, the win interval can be established by any preset number of games establishing the win criteria. Additionally, some game parameters are preset and thus, for example, the win interval or gaming parameters are not established by the gaming owner.

As discussed above, although the foregoing has been made with reference to slot machines, it is not intended to limit the invention. Rather, it is intended to include other preferred embodiments encompassing many variations of play. For instance, in some embodiments, a player could choose to change the win interval such that a longer period is established. In these embodiments, the guaranteed minimum award amount will be set higher, such as, for example, doubled. In other embodiments, this method of play is utilized with cards, such as, blackjack, wherein a player is paid if they lose a consecutive number of games. For card games, a live dealer could be used or a slot machine that replicates the game of blackjack. Still further, this method could be played with roulette. As such, the foregoing is intended to cover all modifications and alternative constructions falling within the spirit and scope of the invention.

What is claimed is:

1. A method for controlling award issuance to a gaming participant from a gaming device having a counter, wherein the gaming device has a set of winning combinations and a corresponding set of award amounts for each winning combination in the set, and wherein the gaming participant places a wager to participate in a game, comprising the steps of:

setting the counter to zero;

selecting a win interval, wherein the win interval includes the number of games to be played by the gaming participant and a minimum amount of wager per game;

controlling the gaming device such that the counter increment upon the playing of a game in which the participant has wagered the minimum amount of wager; and no winning combination is achieved;

notifying the participant when the counter has incremented to the win interval; and providing the participant the option of advancing to a subsequent play level or receiving at least the minimum award amount.

2. A method for controlling award issuance as claimed in claim 1, further comprising the steps of:

advancing the game to a subsequent play level; and resetting the minimum award amount, such that the minimum award amount corresponds to the subsequent play level.

3. A method for controlling award issuance as claimed in claim 1, further comprising the step of initiating a game, wherein the game results in a winning combination.

4. A method for controlling award issuance as claimed in claim 3, further comprising the step of issuing the award amount that corresponds to the winning combination.

5. A method of gaming as claimed in claim 1, wherein the win interval is determined by a predetermined number of consecutive losses of a plurality of games played.

6. A method of gaming as claimed in claim 1, wherein the win interval is set at a predetermined value which is calculated by the summation of the total number of wins and losses of a plurality of games played, wherein the number of wins is no greater than a predetermined value.

7. A method for gaming in a slot machine having a predetermined win interval and incremental play levels, wherein achievement of the win interval allows advancement to a subsequent play level, wherein each play level corresponds to a predetermined minimum award amount; the slot machine further including an incremental counter and an actuating lever arm for spinning a reel containing a series of symbols, wherein an end user inserts a wager and actuates the lever arm such that a combination of symbols appears on a viewing line at the cessation of the spin, comprising the steps of:

(a) setting the counter of the slot machine to zero at the initiation of a play level;

(b) comparing the amount of wager inserted into the slot machine to a preset minimum wager;

(c) comparing the combination of symbols on the viewing line to a predetermined set of winning combinations;

(d) paying the user a predetermined award amount if a winning combination appears on the viewing line;

(e) incrementing the counter by one if no winning combination appears and the minimum wager was inserted into the slot machine;

(f) repeating steps (b)–(e) until the user is paid or the counter increments to the predetermined win interval;

(g) advancing to the next play level; and (h) resetting the minimum award corresponding to the next play level, wherein the step of resetting the minimum award increases the minimum award.

8. A method for gaming in a slot machine having a predetermined win interval and incremental play levels, wherein achievement of the win interval allows advancement to a subsequent play level, wherein each play level corresponds to a predetermined minimum award amount; the slot machine further including an incremental counter and an actuating lever arm for spinning a reel containing a series of symbols, wherein an end user inserts a wager and actuates the lever arm such that a combination of symbols appears on a viewing line at the cessation of the spin, comprising the steps of:

(a) setting the counter of the slot machine to zero at the initiation of a play level;

(b) comparing the amount of wager inserted into the slot machine to a preset minimum wager;

(c) comparing the combination of symbols on the viewing line to a predetermined set of winning combinations;

(d) paying the user a predetermined award amount if a winning combination appears on the viewing line;

(e) incrementing the counter by one if no winning combination appears and the minimum wager was inserted into the slot machine;

(f) repeating steps (b)–(e) until the user is paid or the counter increments to the predetermined win interval;

notifying the user that the minimum win interval is achieved; and providing the user an option of initiating an automatic spin until a winning combination appears on the viewing line or advancing to a subsequent play level.

9. A method of gaming as claimed in claim 8, further comprising the steps of:

advancing to a subsequent play level; and resetting the minimum award to correspond to the play level.

10. A gaming machine having a plurality of independently rotatable reels, wherein each reel contains a set of symbols, and an actuating lever arm for spinning the reels, wherein a gaming participant inserts at least one credit and actuates the lever arm such that a combination of symbols appears on a viewing line at the cessation of the spin, comprising:

means for defining a set of winning combinations of symbols and a set of awards, wherein each winning combination of symbols corresponds to an award amount; and means for defining a win interval, wherein the win interval includes the number of games to be played by the gaming participant and a minimum amount of credits to be inserted per game;

means for determining a winning combination;

means for counting the number of credits inserted;

a counter;

means for awarding a participant a predetermined award amount, wherein the award amount corresponds to a winning combination;

means for identifying the achievement of the win interval; and means for automatically initiating repeated spins of the reels without intervention by the participant after the win interval has been achieved, wherein said repeated spins of the reels are continued until a combination belonging to the set of combinations of winning symbols appears on the viewing line at the cessation of one of the repeated spins.

11. A gaming machine as claimed in claim 10, wherein the counter is configured to determine the win interval, wherein the win interval is determined by a predetermined number of consecutive losses of a plurality of games played.

12. A gaming machine as claimed in claim 10, wherein the counter is configured to determine the win interval, wherein the win interval is set at a predetermined value which is calculated by the summation of the total number of wins and losses of a plurality of games played, wherein the number of wins is no greater than a predetermined value.

13. A gaming device for providing a gaming participant with games of chance for wagered stakes, the gaming device having a counter configured to count each game played, wherein the gaming device has a set of winning combinations and a corresponding set of award amounts containing at least one award amount for each winning combination in the set of winning combinations, and wherein the gaming device is configured to perform the steps of:

setting the counter to zero;

selecting a win interval, wherein the win interval comprises a number of games to be played by the gaming participant and a minimum amount of wager per game;

incrementing the counter upon the playing of a game in which the participant has wagered the minimum amount of wager, and no winning combination is achieved;

notifying the participant when the counter has incremented to the win interval; and providing the participant the option of advancing to a subsequent play level or receiving at least the minimum award amount.

14. The gaming device of claim 13, wherein the gaming device is configured to further perform the steps of:

advancing the game to a subsequent play level; and resetting the minimum award amount, such that the minimum award amount corresponds to the subsequent play level.

15. The gaming device according to claim 13, wherein the gaming device is configured to perform the step of automatically initiating a free game after said providing step wherein the participate has selected the option of receiving at least the minimum award amount, wherein the free game results in a winning combination.

16. The gaming device according to claim 15, wherein the gaming device is configured to further perform the step of issuing the award amount that corresponds to the winning combination.

17. The gaming device according to claim 13, wherein the gaming device is configured to further perform the step of selecting the win interval by determining a predetermined number of consecutive losses of a plurality of games played.

18. The gaming device of claim 13, wherein the gaming device is configured to further perform the step of selecting the win interval by calculating the summation of the total number of wins and losses of a plurality of games played, wherein the number of wins is no greater than a predetermined value.

19. The gaming device according to claim 13, wherein the gaming device further comprises:

means for selecting a symbol from each of a plurality of independent symbol sets, wherein each combination in the set of winning combinations comprises a symbol from each of the plurality of independent symbol sets, and the games of chance are played by selecting a random combination comprised of a symbol from each of the independent symbol sets; and wherein the gaming device is configured to further perform the step of determining the minimum award amount, when the participant selects the option of receiving at least the minimum award amount, by repeatedly playing the games of chance without requiring the minimum amount of wager per game, until a winning combination is selected.

20. The gaming device of claim 19, wherein the gaming device is configured to further perform the step of determining the minimum award amount by automatically initiating, without intervention from the participant, each player of the games of chance that are repeatedly played without requiring the minimum amount of wager per game.

* * * * *

UNITED STATES PATENT AND TRADEMARK OFFICE
CERTIFICATE OF CORRECTION

PATENT NO. : 6,270,409 B1
DATED : August 7, 2001
INVENTOR(S) : Brian Shuster

It is certified that error appears in the above-identified patent and that said Letters Patent is hereby corrected as shown below:

<u>Column 11,</u>
Line 10, ";" after the word "wager" should be -- , --
Lines 8-9, "increment" should be -- increments --

<u>Column 13,</u>
Line 40, "participate" should be -- participant --

Signed and Sealed this

Second Day of September, 2003

JAMES E. ROGAN
*Director of the United States Patent and Trademark Office*